United States Patent [19]

Ellingsen

[11] Patent Number: 5,549,320
[45] Date of Patent: Aug. 27, 1996

[54] COMBINED VEHICLE SUSPENSION TORQUE ROD AND SWAY BAR

[75] Inventor: Svein Ellingsen, Bothell, Wash.

[73] Assignee: PACCAR Inc., Bellevue, Wash.

[21] Appl. No.: 427,791

[22] Filed: Apr. 26, 1995

[51] Int. Cl.⁶ .......................... B60G 9/02; B60G 11/27; B60G 21/055

[52] U.S. Cl. .................. 280/689; 280/713; 280/683; 267/256; 180/378

[58] Field of Search ................... 280/689, 713, 280/725, 676, 683, 684, 685, 723; 267/188, 228, 248, 256; 180/24.01, 378, 349

[56] References Cited

U.S. PATENT DOCUMENTS

| | | | |
|---|---|---|---|
| 2,081,007 | 5/1937 | Geissen | 280/725 |
| 2,266,280 | 12/1941 | Sherman | 280/725 |
| 3,154,321 | 10/1964 | McLean | 280/713 |
| 3,402,940 | 9/1968 | de Coye de Castelet | 280/723 |
| 3,887,025 | 6/1975 | Kaltwasser | 280/724 |
| 4,360,221 | 11/1982 | Wagner | 280/689 |
| 4,415,179 | 11/1983 | Marinelli | 280/713 |
| 4,429,900 | 2/1984 | Feher | 280/689 |
| 4,632,422 | 12/1986 | Csordas et al. | 280/689 |
| 4,637,628 | 1/1987 | Perkins | 280/689 |
| 4,784,406 | 11/1988 | Stinson | 280/665 |
| 4,883,287 | 11/1989 | Murakami et al. | 280/665 |
| 5,016,904 | 5/1991 | Weber | 280/664 |
| 5,074,582 | 12/1991 | Parsons | 280/721 |
| 5,106,120 | 4/1992 | Di Maria | 280/689 |
| 5,161,818 | 11/1992 | Kopieczek | 280/723 |

FOREIGN PATENT DOCUMENTS

| | | | |
|---|---|---|---|
| 3641505A1 | 6/1987 | Germany. | |
| 1-95919 | 4/1989 | Japan | 280/725 |

OTHER PUBLICATIONS

"Das Phantom aus München," *Fernfahrer*, NR. 8, pp. 29–33, Aug. 1993.
IVECO Air Suspension, published prior to Apr. 26, 1995.
VOLVO (Europa) 8–Bag Suspension, 1991.
M.A.N. 4–Bag/Axle Suspension, published prior to Apr. 26, 1995.
PACCAR A-256 Air Suspension, 1989.
Kenworth Airglide 100 Suspension, 1976.

*Primary Examiner*—Eric D. Culbreth
*Assistant Examiner*—Peter C. English
*Attorney, Agent, or Firm*—Seed and Berry LLP

[57] ABSTRACT

A suspension assembly comprising a combination torque rod and sway bar is shown and described. In a preferred embodiment, the assembly comprises two arms that are pivotally coupled at a first end to a first and second end of a crossmember, the second ends of the arms being coupled to a vehicle axle. By providing a suspension assembly in this manner, the arms function as torque rods to absorb the longitudinal stresses generated by the acceleration and deceleration of the vehicle. The arms also work in combination with the crossmember to function as a sway bar, the pivotal coupling between the arms and crossmember allowing the assembly to transfer vertical forces from one side to the other, while still allowing the axle to cross-articulate. In this manner, the number of components, weight, and cost of manufacture is minimized, traction is improved, and component fatigue and failure is minimized.

6 Claims, 7 Drawing Sheets

COMBINED VEHICLE SUSPENSION TORQUE ROD AND SWAY BAR

DESCRIPTION

1. Technical Field

This invention relates to vehicle suspensions, and more particularly, to a combined vehicle suspension torque rod and sway bar.

2. Background of the Invention

In currently available vehicle suspensions, it is common to provide a sway bar that is generally U-shaped and connected at its two end points to a vehicle axle, and that is suspended or hung from a vehicle frame by a linkage on either side of the vehicle. When the vehicle moves fast through a turn, it will sway to one or the other side as a result of the suspension springs being compressed more on one side than the other side, thereby lifting the end of the sway bar arm closer to the frame on one side than on the other. This motion is then translated across the sway bar, causing the sway bar arm on the opposite side to have a vertical lifting force at the axle end. The reaction force from this lifting force then is transmitted up to the frame via the sway bar frame linkages. One linkage will have a compressive force while the other one will have a tension force, thereby reducing the vehicle sway.

In such a conventional suspension system it is also common to provide a torque rod that is coupled at one end to the vehicle frame via a solid linkage or bracket, and coupled at a second end to the axle. The torque rod therefore absorbs high stresses that are generated by accelerating and decelerating the vehicle. However, such systems have multiple components and are therefore relatively heavy and expensive to manufacture.

In another currently available system, a single U-shaped member passes through a solid linkage or bracket coupled to the vehicle frame, and the U-shaped member functions as both the torque rods and sway bar. This configuration is not completely satisfactory, however, in that the sway bar tends to bind up, thereby hindering the axle's ability to cross-articulate. As a result, the traction of the vehicle is reduced, and extreme stresses are placed on the sway bar and on the frame bracket through which the sway bar passes, thereby causing fatigue and possible failure of the sway bar or bracket.

A need therefore exists for a suspension assembly that is relatively lightweight and simple to manufacture, and that will function as desired while minimizing component stress and failure.

SUMMARY OF THE INVENTION

It is therefore an object of this invention to provide an improved suspension assembly.

It is another object of this invention to provide a torque rod and sway bar that will minimize the weight and cost of manufacture.

It is another object of this invention to provide a torque rod and sway bar that will function as desired while minimizing component stress and failure.

These and other objects of the invention, as will be apparent herein, are accomplished by providing a suspension assembly having a combined torque rod and sway bar. In a preferred embodiment, the assembly comprises a crossmember and two arms, one of the arms being pivotally coupled to a first end of the crossmember and the second arm being pivotally coupled to a second end of the crossmember. The free ends of the arms are coupled to an axle, such that the arms are substantially perpendicular to the axle and the crossmember is substantially parallel to the axle, the crossmember being longitudinally spaced from the axle by the length of the arms.

By providing a suspension assembly in this manner, the arms of the assembly function as torque rods. By pivotally coupling the arms to the crossmember, sufficient cross-articulation of the axle is allowed by the pivots or hinge points, thereby improving the traction of the vehicle and reducing the stresses on the arms. However, vertical forces will still be communicated from one side of the vehicle to the other, thereby allowing the arms and crossmember to function together as a sway bar.

DETAILED DESCRIPTION OF THE INVENTION

Figure 1:
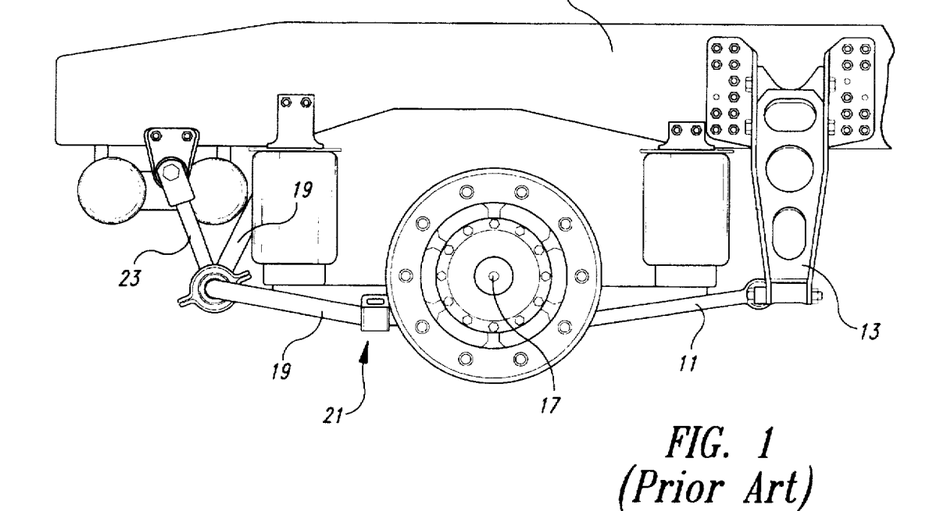
FIG. 1 is a front elevational schematic illustration of a prior art suspension assembly.

FIG. 1 illustrates a prior art suspension system, wherein a torque rod 11 is coupled at one end to the frame 15 via a solid linkage or bracket 13 and at a second end to an axle 17. A U-shaped sway bar 19 is coupled to the axle 17 at its end points 21. The sway bar 19 is suspended from frame 15 via linkage 23. As described previously, the sway bar transmits vertical forces from one side of the vehicle to the other, thereby acting to minimize vertical displacement of the axle, for example, when a vehicle moves through a turn in which it may have a tendency to sway to one side. As described above, the torque rods work to absorb high stresses that are generated by accelerating and decelerating the vehicle. This configuration comprises several parts, however, and it is therefore relatively heavy and expensive to manufacture and install.

Figure 2:
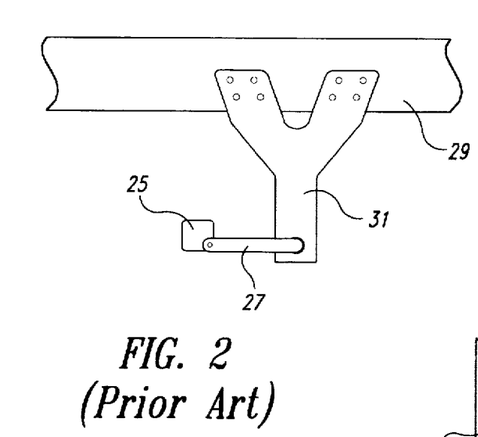
FIG. 2 is a front elevational schematic illustration of an alternative prior art suspension assembly.
Figure 3:
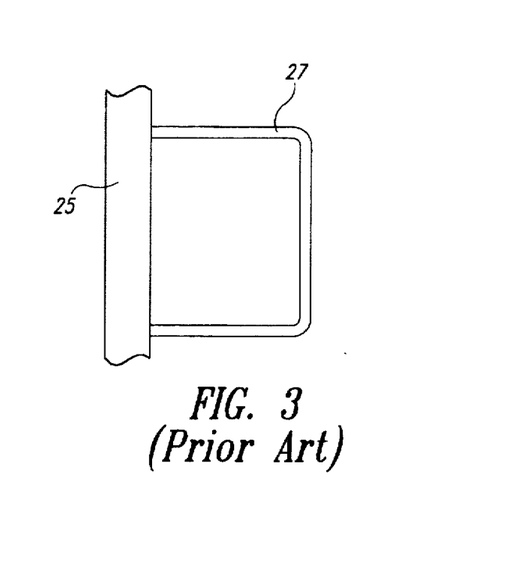
FIG. 3 is a top plan view of a portion of the prior art system of FIG. 2.
Figure 8:
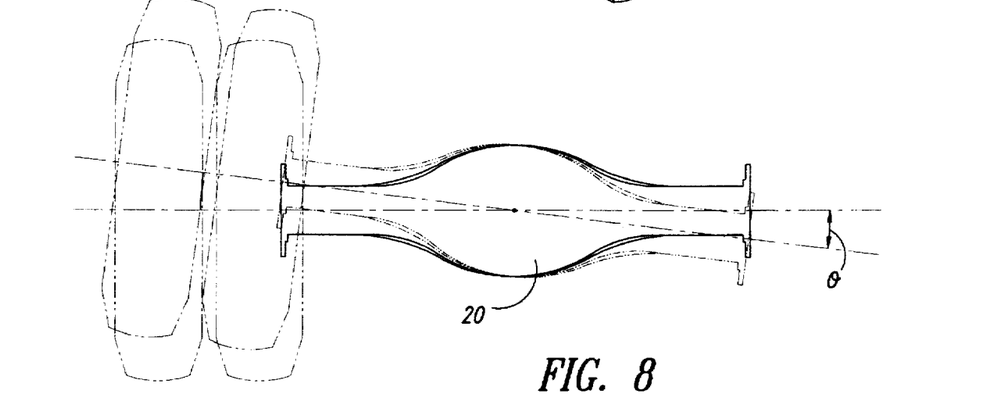
FIG. 8 is a right side elevational view of an axle of FIG. 4.

In an alternative prior art system, as illustrated in FIGS. 2 and 3, a unitary, U-shaped member 27 functions as both torque rods and a sway bar. The combination torque rod/sway bar 27 is coupled at its end points to an axle 25. The combination torque rod/sway bar 27 is coupled to frame 29 by passing through a bracket 31 on either side of the vehicle. This configuration is not completely satisfactory, however, because it does not allow the axle 25 to cross-articulate sufficiently, which as illustrated in FIG. 8 at θ, is a pivoting motion of the axle 20, resulting in vertical and lateral displacement of the axle. As the axle 25 tries to cross-articulate in the prior art system illustrated in FIGS. 2 and 3, its ability to do so is hindered by the combination torque rod/sway bar 27, which tends to bind up. This inability to cross-articulate reduces the traction of the vehicle, and places extreme stresses on the torque rod/sway bar 27 and bracket 31, thereby causing fatigue and potential failure of the torque rod/sway bar 27 and bracket 31.

Figure 4:
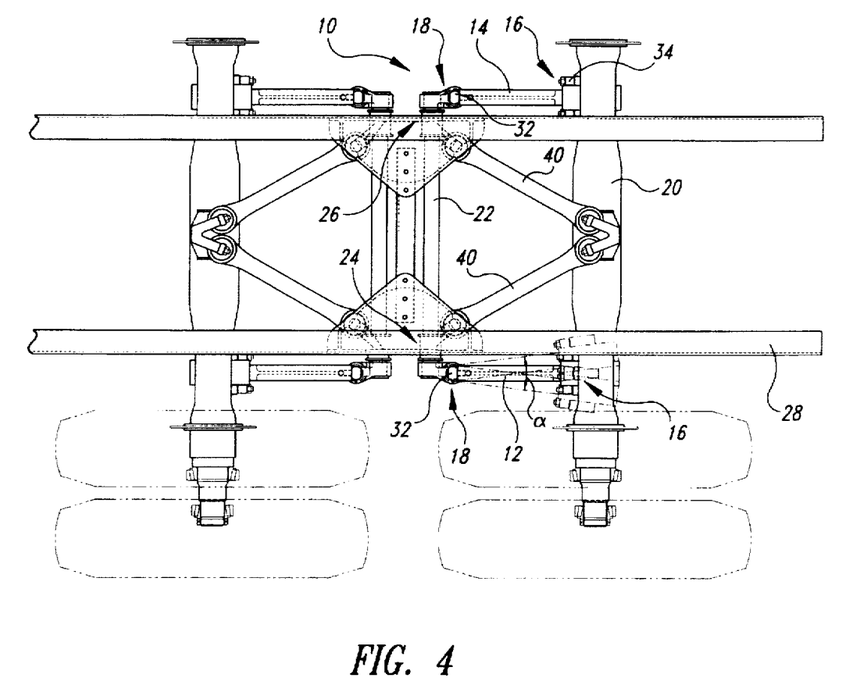
FIG. 4 is a top plan view of a preferred embodiment of the present invention.
Figure 5:
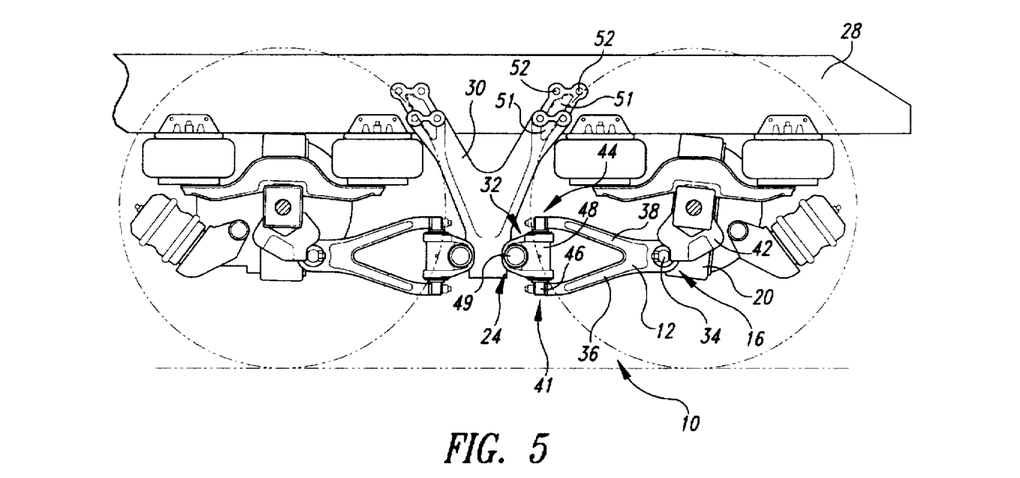
FIG. 5 is a front elevational view of the preferred embodiment illustrated in FIG. 4, including a frame bracket.
Figure 6:
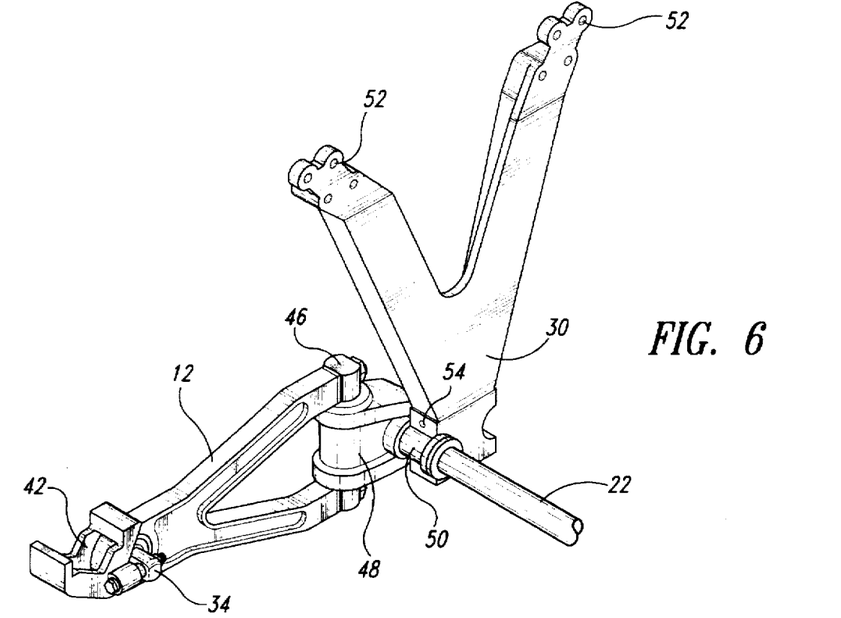
FIG. 6 is a rear isometric view of the preferred embodiment illustrated in FIG. 5.

These shortcomings of currently available systems are overcome by a suspension assembly 10 constructed in accordance with the present invention, as illustrated in FIGS. 4–6. The suspension assembly 10 comprises a first arm 12 and second arm 14 that are each provided with a first end 16 and a second end 18. The first end 16 of each of the first and second arms 12 and 14 is coupled to an axle 20. As illustrated in FIGS. 5 and 6, the first and second arms 12 and 14 are coupled to the axle 20 via a conventional axle seat 42 and ball joint rubber bushings 34. Axle seat 42 is welded to the axle. The second end 18 of the first arm 12 is pivotally coupled to a first end 24 of a crossmember 22, and the second end 18 of the second arm 14 is pivotally coupled to a second end 26 of the crossmember 22. In a preferred embodiment, the arms 12 and 14 are pivotally coupled to the crossmember 22 via hinge joints 32.

Figure 7:
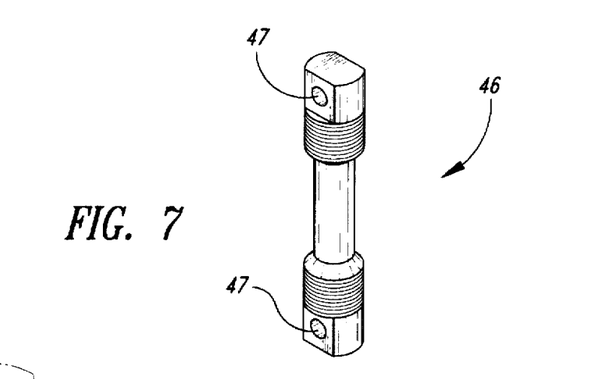
FIG. 7 is a from elevational view of a pin used in the preferred embodiment illustrated in FIG. 4.

As best seen in FIGS. 5–7, each hinge joint 32 is comprised of a threaded pin 46 that passes through joint casing 48 and that is bolted via holes 47 to the ends of each arm. The crossmember 22 is coupled to the joint casing 48 via a tapered spline and bolt 49. The crossmember 22 is therefore stationary with respect to joint casing 48; however, each pin 46 creates a pivot point about which each respective arm may move, as illustrated in FIG. 4 at α. This motion about the pivot points allows the axle to cross-articulate, thereby minimizing the stress that is placed on the system. By reducing the stresses, lighter parts may be used, thereby reducing the weight and cost of the suspension. In a preferred embodiment, the axle is allowed to cross-articulate ±6°, which corresponds to an α of approximately 14.5°, the amount of cross-articulation and lateral movement of the arms 12 and 14 being limited by the torsional resistance of crossmember 22. If a greater degree of cross-articulation is desired, the stiffness and diameter of the crossmember 22 may be reduced, thereby reducing the torsional resistance.

As best seen in FIGS. 5 and 6, the crossmember 22 is coupled to a vehicle frame 28 via a rigid frame bracket 30 that fits over one-half of the circumference of a rubber bushing 50 provided around crossmember 22, a cap (not shown) surrounding the remainder of the bushing and being bolted into bracket 30 via bolt holes 54. The frame bracket 30 is bolted to frame 28 via bolt holes 52. In a preferred embodiment, portions 51 of the bracket 30 are removed to lighten the bracket.

As further illustrated in FIG. 5, the first arm 12 has a "wishbone" configuration such that the arm 12 has a first finger 36 that is coupled to a first end 41 of the hinge joint 32, and a second finger 38 that is coupled to a second end 44 of hinge joint 32. The second arm 14 has the identical structure as the structure of first arm 12 on the other side of the vehicle. To further position the axle 20 in a lateral direction and to help absorb deceleration and acceleration forces in the longitudinal direction, V-bars 40 are provided between the frame 28 and the axle 20. Although the V-bars may be mounted in any conventional way, in a preferred embodiment, they are mounted in the manner as described below and in applicant's co-pending U.S. patent application Ser. No. 08/429,069, entitled "V-Bar Suspension Linkage."

Figure 9:
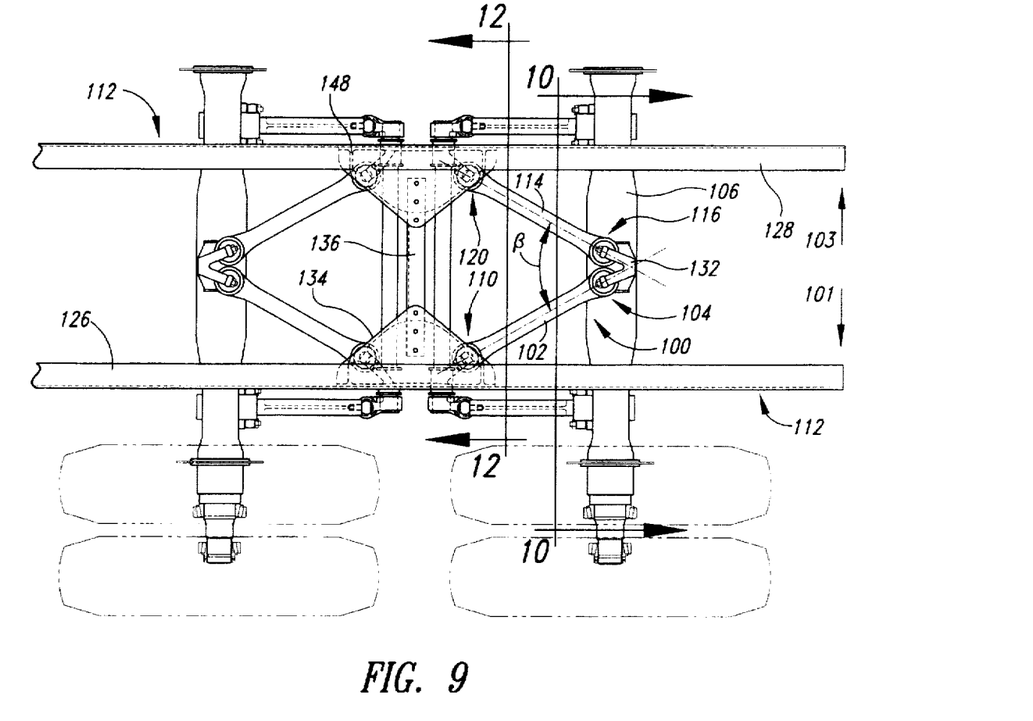
FIG. 9 is a top plan view of a preferred embodiment of the present invention.
Figure 10:
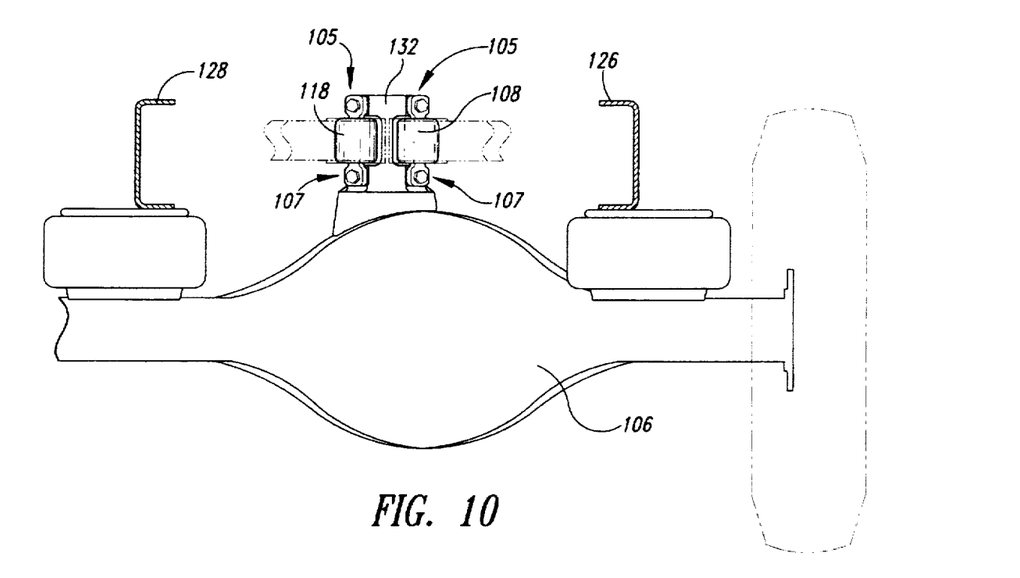
FIG. 10 is a cross-sectional elevational view taken along line 10—10 of FIG. 9.

As illustrated in FIGS. 9 and 10, an axle bracket 132 is mounted on axle 106 so that axle bracket 132 is centered with respect to the vehicle frame 112 having a first frame rail 126 and second frame rail 128. The axle bracket 132 is configured to engage two vertically oriented bushing pins 108, 118. The first and second vertically oriented bushing pins 108, 118 serve as the anchor points for a first arm 102 and second arm 114 respectively, the first and second arms extending outwardly at an angle to each other to form V-bar linkage 100.

As best seen in FIG. 10, a first end 104 of first arm 102 surrounds the first vertically oriented bushing pin 108, and the first end 116 of second arm 114 surrounds the second vertically oriented bushing pin 118. Unlike prior art configurations wherein the bushing pins are horizontally mounted, the vertical orientation of bushing pins 108 and 118 allow the first end of each of the first and second arms to be closer together at the axle 106 or vertex of the V-bar linkage. As a result, a greater angle β is achieved, as measured between a center line of each arm. In a preferred embodiment, β is 56°–72°. It is believed that by increasing this angle, stresses in the arms and bushings are reduced, thereby improving the reliability of the system. Furthermore, by orienting bushing pins 108 and 118 in a vertical direction, it is possible to provide a narrower axle bracket 132, thereby reducing the width and weight of the bracket.

Figure 11:
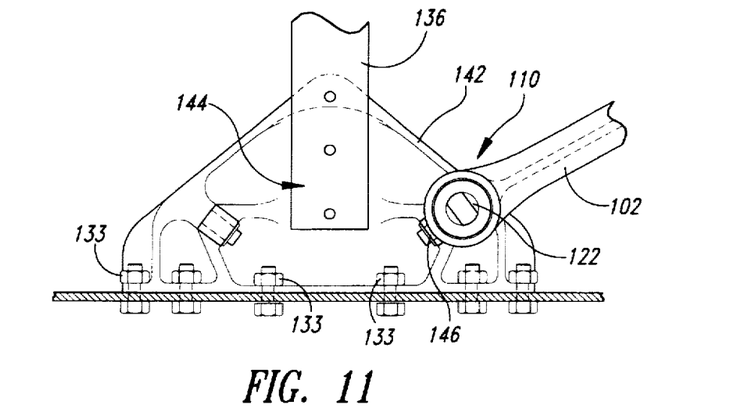
FIG. 11 is an enlarged top plan view of a portion of the preferred embodiment illustrated in FIG. 9.
Figure 12:
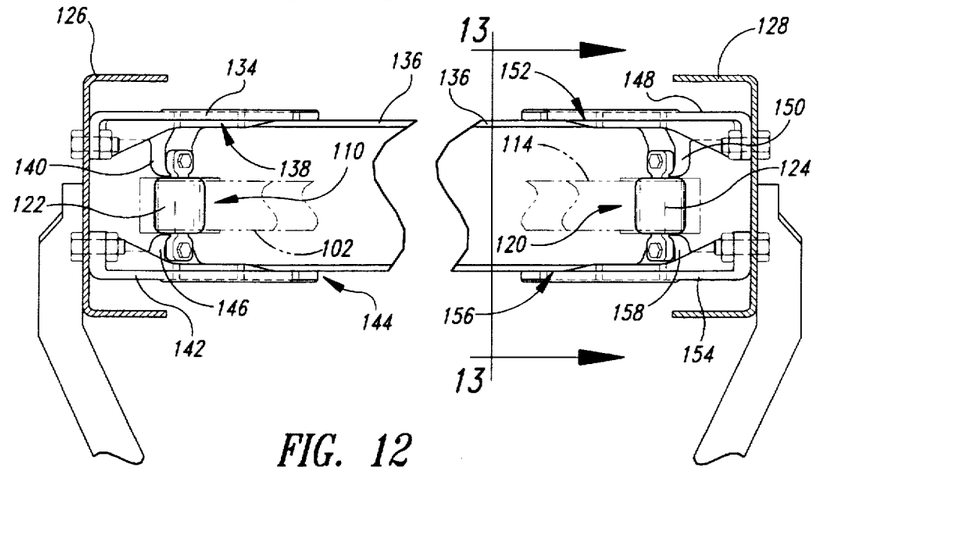
FIG. 12 is a cross-sectional elevational view taken along line 12—12 of FIG. 9.
Figure 13:
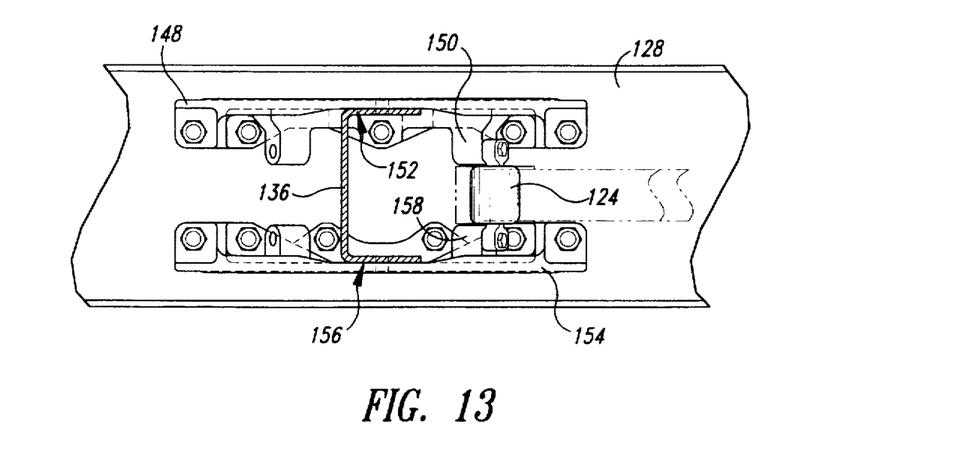
FIG. 13 is a cross-sectional elevational view taken along line 13—13 of FIG. 12.

As illustrated in FIGS. 11–13, a second end 110 of first arm 102 is coupled to first frame rail 126 via a third vertically oriented bushing pin 122. In a ladder-type vehicle frame, crossmembers such as that illustrated at 136 extend between the frame rails 126 and 128. Crossmember 136 is coupled to the frame via a first gusset 134 that is coupled, for example, via bolts, to a first upper surface 138 of crossmember 136. A second gusset 142 is coupled to a first lower surface 144 of crossmember 136, and then the first and second gussets are coupled, for example via bolts 133, to the frame rail. In a preferred embodiment of the present invention, a first anchor lug 140 is provided on the first gusset 134, and a second anchor lug 146 is provided on the second gusset 142, the first and second anchor lugs being spaced to accommodate and engage the third vertically oriented bushing pin 122.

Similarly, the second end 120 of second arm 114 is coupled to the second frame rail 128 via a fourth vertically oriented bushing pin 124. Frame crossmember 136 is coupled to the second frame rail 128 via a third gusset 148 that is coupled to a second upper surface 152 of crossmember 136, and via a fourth gusset 154 that is coupled to a second lower surface 156 of the crossmember, the third and fourth gussets being coupled to the frame rail. A third anchor lug 150 is provided on third gusset 148 and a fourth anchor lug 158 is provided on the fourth gusset 154. The third and fourth anchor lugs are spaced to accommodate and engage the fourth vertically oriented bushing pin 124. By providing anchor lugs on the gussets to engage the vertically oriented bushing pins, the need for an additional bracket to secure the bushing pin is eliminated. The cost and weight of the system is therefore reduced.

Figure 14:
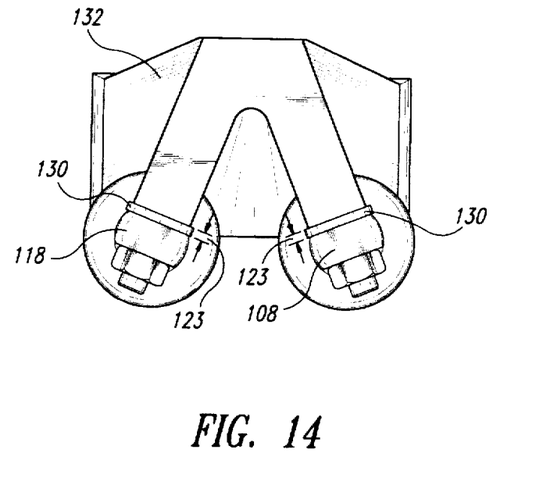
FIG. 14 is an enlarged top plan view of an axle bracket as illustrated in FIG. 9.
Figure 15:
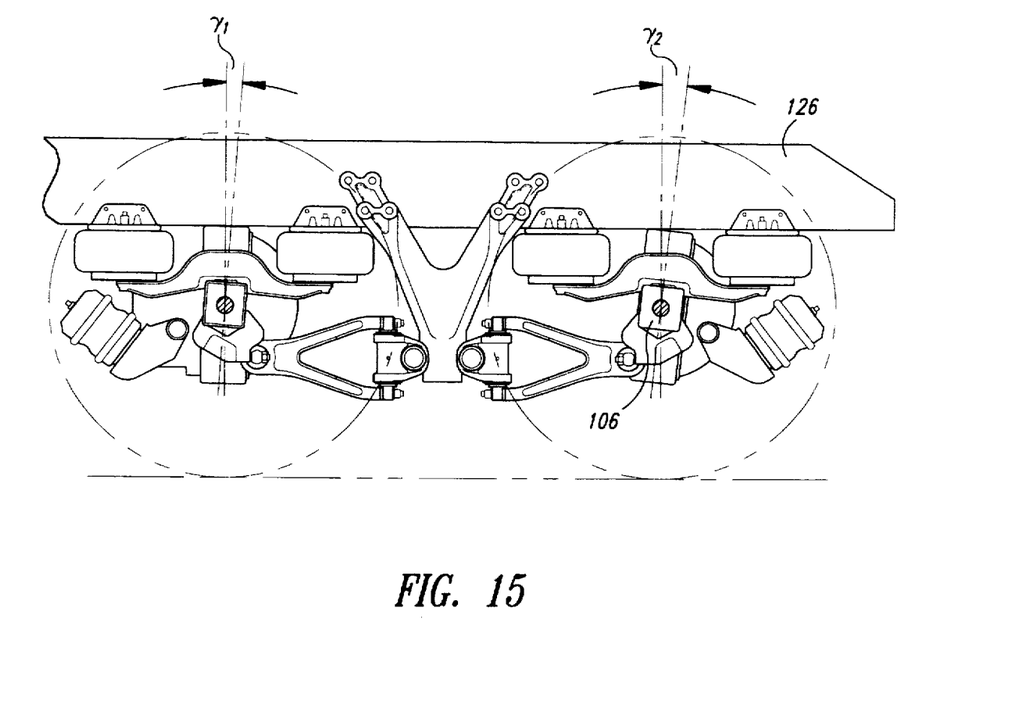
FIG. 15 is a front elevational view of the preferred embodiment illustrated in FIG. 9.
Figure 16:
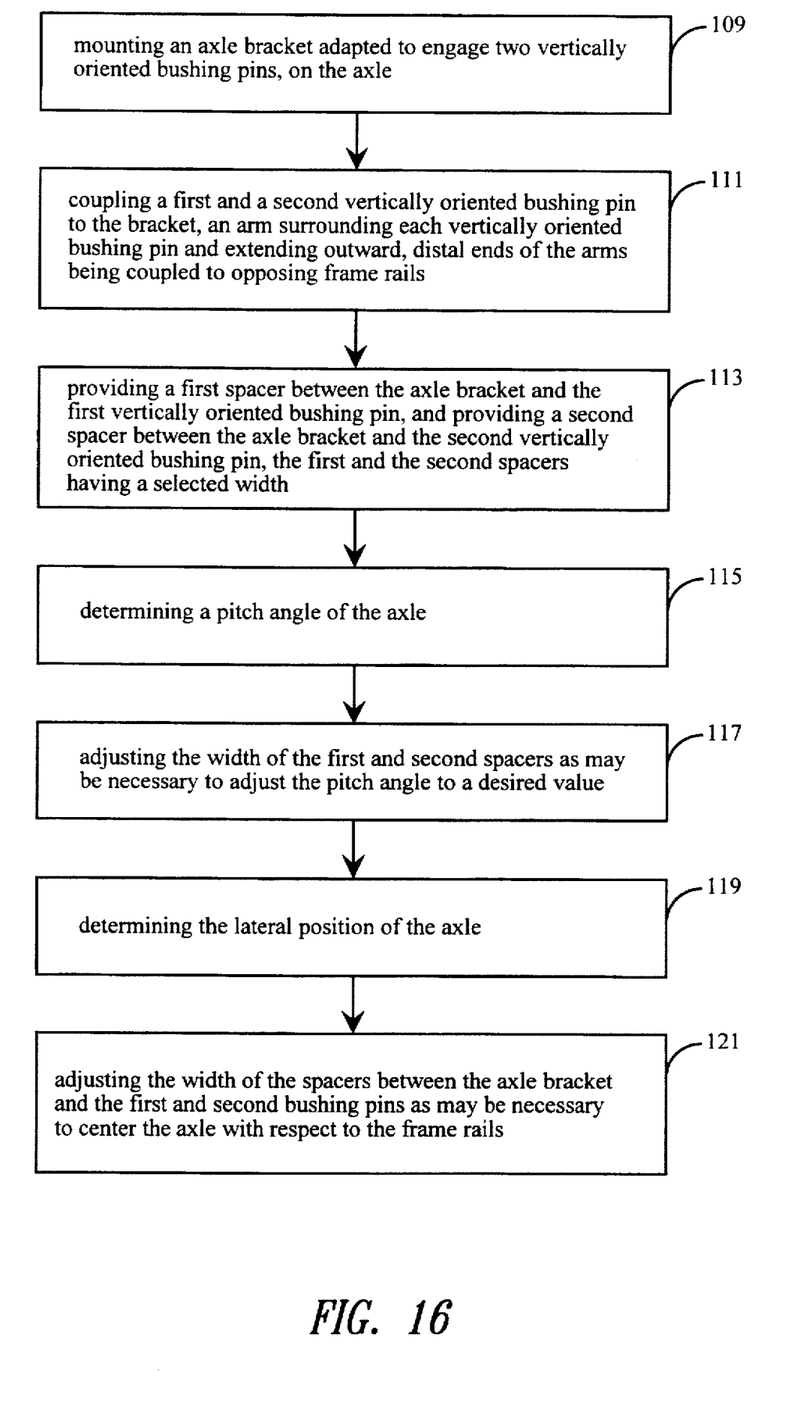
FIG. 16 is a diagram illustrating the steps of a preferred embodiment of the present invention.

By providing a V-bar suspension linkage in accordance with the present invention, the position and alignment of the axle may be easily adjusted at the axle bracket 132 via spacers 130 that are placed between the axle bracket and the bushing pins 108 and 118, as best seen in FIG. 14. In a preferred embodiment, the axle and V-bar linkage are initially mounted using spacers having a selected thickness 123, for example 0.5 inch, steps 109, 111 and 113. (It will be understood that for each bushing pin spacers of equal thickness are placed on both the top and bottom linkage points 105 and 107 with the axle bracket.) The slant and lateral location of the axle is then determined, and adjusted as desired using spacers. For example, as illustrated in FIG. 15, a desired slant or pitch $\gamma_1$ for a front axle may be 2.5°, while the desired pitch $\gamma_2$ of the rear axle 106 may be 10.75°. (It will be understood by one of ordinary skill in the art that the degree of slant desired is dependent on the axle and transmission configuration.) Assuming, for example, that the pitch of axle 106 is measured to be 10°, step 115, thicker spacers, of equal width, are placed between the axle bracket 132 and first and second bushing pins 108 and 118, thereby forcing the axle 106 to rotate backwards to the desired pitch. Conversely, if the axle slant is too great, initial spacers 130 located between the axle bracket 132 and first and second bushing pins 108 and 118 are replaced by thinner spacers, of equal width, thereby allowing the axle to tilt forward, step 117.

In terms of the lateral position of the axle, it is desirable to center axle 106 between the frame rails 126 and 128. If it is determined, for example, that the axle is too far to the left, step 119, left being indicated at reference arrow 101 in FIG. 9, the original spacers between the axle bracket and the first bushing pin 108 are replaced by thicker spacers, and the spacers between the frame bracket and second bushing pin 118 are replaced by thinner spacers, the difference in thickness between the original spacers and the thicker and thinner spacers being the same. The axle will therefore move to the right, step 121. Similarly, if it is desired to shift the axle to the left, thicker spacers would replace the initial spacers between the axle bracket and second bushing pin 118, and thinner spacers would replace the initial spacers between the axle bracket and first bushing pin 108, the thickness of the new spacers differing from the thickness of the initial spacers by the same amount. The axle will therefore shift to the left. The axle may therefore be very simply and accurately adjusted as desired.

By providing a suspension assembly 10 in accordance with a preferred embodiment of the present invention, the first and second arms 12 and 14 function as torque rods to absorb forces generated by the acceleration and deceleration of the vehicle. The first and second arms 12 and 14 also work in conjunction with the crossmember 22 to transmit vertical forces from one side of the assembly to the other, thereby functioning as a sway bar and minimizing vertical displacement of the axle 20. However, unlike prior art configurations which bind up, the hinge joints 32 allow the axle 20 to cross-articulate, thereby improving the traction of the vehicle and minimizing the stresses that are placed on the system components and bracket 30.

A suspension assembly has been shown and described. From the foregoing, it will be appreciated that although embodiments of the invention have been described herein for purposes of illustration, various modifications may be made without deviating from the spirit of the invention. Thus, the present invention is not limited to the embodiments described herein, but rather is defined by the claims which follow.

I claim:

1. A suspension assembly for a vehicle comprising:

a first arm and a second arm, the first and second arms being laterally spaced and substantially parallel, a first end of each arm being coupled to an axle;

a crossmember having a first end and a second end, the crossmember being substantially parallel to the axle, the first and second ends of the crossmember being pivotally coupled respectively to a second end of each of the first and second arms via vertically oriented pins such that vertical forces are translated from the arms to the crossmember, the crossmember and arms thereby functioning as a sway bar; and a first bracket coupled to the first end of the crossmember and to a frame of the vehicle, and a second bracket coupled to the second end of the crossmember and to the frame, such that the crossmember is substantially fixed in a lateral direction.

2. The suspension assembly according to claim 1 wherein the first end of each of the first and second arms is coupled to the axle via a ball joint.

3. The suspension assembly according to claim 1 wherein the first arm has a first finger and a second finger, the first finger of the first arm being coupled to a first end of a first hinge joint and the second finger of the first arm being coupled to a second end of the first hinge joint, the hinge joint pivotally coupling the first arm to the crossmember; and the second arm has a first finger and a second finger, the first finger of the second arm being coupled to a first end of a second hinge joint and the second finger of the second arm being coupled to a second end of the second hinge joint, the second hinge joint pivotally coupling the second arm to the crossmember.

4. A vehicle suspension comprising:

a vehicle frame;

an axle;

a first arm and a second arm, each having a first end and a second end, the first end of each of the first and second arms being coupled to the axle and the second end of each of the first and second arms being pivotally coupled to a crossmember via vertically oriented pins such that vertical forces are translated from the arms to the crossmember, the crossmember and arms thereby functioning as a sway bar;

the crossmember having a first and a second end and being substantially parallel to the axle, the crossmember being coupled to the frame via a first bracket coupled to the frame and to the first end of the crossmember and via a second bracket coupled to the frame and to the second end of the crossmember.

5. The vehicle suspension according to claim 4 wherein the first end of each of the first and second arms is coupled to the axle via a ball joint.

6. The vehicle suspension according to claim 4 wherein the first arm has a first finger and a second finger, the first finger of the first arm being coupled to a first end of a first hinge joint and the second finger of the first arm being coupled to a second end of the first hinge joint, the hinge joint pivotally coupling the first arm to the crossmember; and the second arm has a first finger and a second finger, the first finger of the second arm being coupled to a first end of a second hinge joint and the second finger of the second arm being coupled to a second end of the second hinge joint, the second hinge joint pivotally coupling the second arm to the crossmember.

* * * * *